United States Patent [19]
Dorai et al.

[11] Patent Number: 5,155,283
[45] Date of Patent: Oct. 13, 1992

[54] POLYMERIZATION OF TETRAHYDROFURAN USING TRIFLUOROMETHANE SULFONIC ACID MONOHYDRATE AS CATALYST

[75] Inventors: Suriyanarayan Dorai, Lockport, N.Y.; Gary A. Hida, Wilmington, Del.

[73] Assignee: E. I. Du Pont de Nemours and Company, Wilmington, Del.

[21] Appl. No.: 733,201

[22] Filed: Jul. 19, 1991

Related U.S. Application Data

[63] Continuation-in-part of Ser. No. 671,431, Mar. 19, 1991, abandoned.

[51] Int. Cl.$^5$ .............................................. C07C 43/04
[52] U.S. Cl. .................................................. 568/617
[58] Field of Search ......................................... 568/617

[56] References Cited

U.S. PATENT DOCUMENTS

| | | | |
|---|---|---|---|
| 3,864,287 | 2/1975 | Matsuda et al. | 568/617 |
| 4,120,903 | 10/1978 | Pruckmayr et al. | 568/617 |
| 4,608,422 | 8/1986 | Mueller | 525/410 |
| 4,988,797 | 1/1991 | Wardle et al. | 568/617 |
| 5,099,074 | 3/1991 | Mueller et al. | 568/617 |

OTHER PUBLICATIONS

Encyclopedia of Polymer Science and Engineering, vol. 16, 1989, John Wiley & Sons, pp. 649-681.

Primary Examiner—Marianne M. Cintins
Assistant Examiner—Rebecca Cook

[57] ABSTRACT

A process for forming polytetramethylene ether glycol having a number average molecular weight of 600 to 2,200 by contacting tetrahydrofuran with 5 to 50 wt %, based on tetrahydrofuran, trifluoromethane sulfonic acid monohydrate and water at 20° to 75° C. is disclosed.

6 Claims, No Drawings

POLYMERIZATION OF TETRAHYDROFURAN USING TRIFLUOROMETHANE SULFONIC ACID MONOHYDRATE AS CATALYST

CROSS REFERENCE TO RELATED APPLICATION

This application is a continuation-in-part of application Ser. No. 07/671,431 filed Mar. 19, 1991, now abandoned.

FIELD OF THE INVENTION

The present invention relates to a process for producing polytetramethylene ether glycol having a number molecular weight of from 600 to 2,200. The process involves polymerizing tetrahydrofuran in the presence of trifluoromethane sulfonic acid monohydrate as a catalyst and sufficient water to control the molecular weight of the polymerized tetrahydrofuran within the desired range.

BACKGROUND OF THE INVENTION

Polytetramethylene ether glycol (PTMEG) is a high volume commercial product. PTMEG having a number molecular weight of from 600 to 2,200 is widely used in the formation of block copolymers used as soft (elastomeric) segments in polyurethanes or polyesters such as polytetramethylene terephthalate. The block copolymers with polyurethanes are widely used to form the spandex fibers often found in stretch textile fabrics. The block copolymers with polyesters are used to form injection moldable elastomers having a wide variety of uses, often industrial or automotive.

The ring opening of tetrahydrofuran using dry trifluoromethane sulfonic acid (triflic acid) to form polymers having molecular weights in excess of 10,000 has been reported. However, the commercial grades of PTMEG range in number molecular weight from 600 to 2,200. Consequently dry triflic acid has never been considered a suitable candidate for making PTMEG on a commercial scale.

PTMEG is generally made commercially by polymerizing tetrahydrofuran (THF) using fluorosulfonic acid as the catalyst. In the reaction the sulfate ester of PTMEG is formed which is hydrolyzed to produced PTMEG and sulfuric and hydrofluric acids. About 95-98 wt % of these acids are washed out of the product with water. The residual quantity of acids in the finished product is neutralized with calcium hydroxide. The solids are then filtered, the product dried and sent to a storage tank. This existing process suffers from a number of disadvantages. First, the fluorosulfonic acid, used as the commercial catalyst, is not recoverable because it participates in the reaction and represents an expensive loss. Second, large quantities of acids have to be neutralized which is expensive and the product is undesirable from an environmental point of view because of its toxicity and corrosiveness. Third, the filtration produces a very substantial yield loss and operating expense.

SUMMARY OF THE INVENTION

Trifluoromethane sulfonic acid monohydrate offers a number of advantages for use in polymerization of THF to form PTMEG. First, it has been found that water forms an azeotrope with trifluoromethane sulfonic acid, i.e. trifluoromethane sulfonic acid monohydrate, which boils at 210° C. and behaves as a single compound containing 10.7 wt. % water. Second, the water contained in the trifluoromethane sulfonic acid monohydrate serves to control the molecular weight of the product PTMEG to within the commercially desired range. Third, it is surprising that the trifluoromethane sulfonic acid monohydrate, even though it contains a mole of water, is still strong enough to initiate and continue polymerization since previously used catalysts were strong acids.

DETAILED DESCRIPTION

The reaction of the present invention is brought about by contacting tetrahydrofuran with the monohydrate of trifluoromethane sulfonic acid. Generally, the reaction is carried out in an agitated vessel. Some moderate agitation appears to be required to bring about the reaction.

The number average molecular weight of the product polytetramethylene ether glycol is not dependent on the ratio of trifluoromethane sulfonic acid monohydrate to tetrahydrofuran in the reaction mixture. However, for a given retention time in the polymerization reactor, the conversion of tetrahydrofuran to polytetramethylene ether glycol increases with the amount of trifluoromethane sulfonic acid monohydrate present. The amount of trifluoromethane sulfonic acid monohydrate used generally varies from 5 to 50 wt % and preferably from 10 to 30 wt % of the amount of tetrahydrofuran charged to the reactor. The reaction temperature is generally from 20° to 75° C. with from 40° to 65° C. being the preferred range. Conversion of tetrahydrofuran to polytetramethylene ether glycol is low at the lower temperatures and generally increases with increases in temperature within the useful range. The highest conversion is obtained at temperatures ranging between 55° and 65° C. and subsequently drops to zero somewhere between 80° and 90° C. The molecular weight of the polytetramethylene ether glycol product gradually decreases with increase in reaction temperature.

Ordinarily commercially available tetrahydrofuran contains between 50 and 300 ppm by weight water. If this commercial tetrahydrofuran is used directly with trifluoromethane sulfonic acid monohydrate, the product polytetramethylene ether glycol has a number average molecular weight ranging from 2,000 to 8,000 and the conversion of the tetrahydrofuran to polytetramethylene ether glycol is from 25 to 35 weight percent of tetrahydrofuran charged to the reaction. In order to produce polytetramethylene ether glycol with a number average molecular weight ranging between 600 and 3,000, some additional water should be added to the reaction mixture. The additional water used for this purpose can be mixed with the tetrahydrofuran being charged to the reactor. Generally, the concentration of water in the reaction should be between 1000 and 7,000 ppm based on tetrahydrofuran present to be able to produce polytetramethylene ether glycol having the desired low molecular weights.

Commercially available tetrahydrofuran generally contains an oxidation inhibitor. Butylated hydroxytoluene is a commonly used oxidation inhibitor used with tetrahydrofuran, but other oxidation inhibitors can be used. The polymerization reaction does not appear to be affected by the presence or absence of an oxidation inhibitor. Absence of an oxidation inhibitor, however, sometimes worsens the color of the product polytetramethylene ether glycol.

The polymerization reaction can be described as proceeding stepwise. Step 1 is as follows:

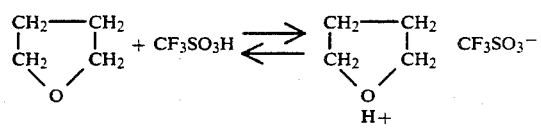

Step 2 then progresses as follows:

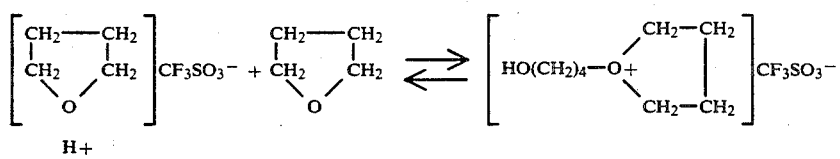

Step 3 and sequential steps, until the desired molecular weight material is obtained, progress as follows:

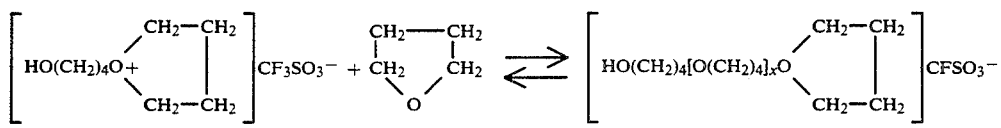

Step 4 is the formation of the glycol by addition of water as follows:

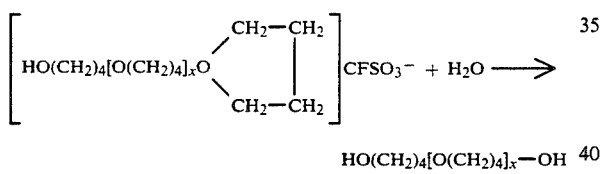

$HO(CH_2)_4[O(CH_2)_4]_x-OH$

EXAMPLES

In all of the examples reported below, the polymerization was carried out in a round-bottomed glass flask fitted with a glass agitator and a reflux condenser cooled by chilled water at 5° C. The tetrahydrofuran used in all of the examples was a commercial grade which contained between 50 and 300 ppm by weight water. In Examples 2 and 3, the reported amount of additional water was added to control the molecular weight to within the desired range.

EXAMPLE 1

Commercial tetrahydrofuran (150.08 g) and trifluoromethane sulfonic acid monohydrate (23.86 g)(1.7 wt. % water) were added to the flask which was maintained at 58°–65° C. At the intervals reported in Table 1, samples were removed from the flask and analyzed. The results are reported in Table 1.

TABLE 1

| Time From Start Hours | Conversion to PTMEG % | Number Average Mol. Wt. Mn | Weight Average Mol. Wt. Mw |
|---|---|---|---|
| 1.00 | 8.78 | 1419 | 2573 |
| 2.08 | 10.86 | 1863 | 3337 |
| 2.92 | 18.80 | 1994 | 3294 |

TABLE 1-continued

| Time From Start Hours | Conversion to PTMEG % | Number Average Mol. Wt. Mn | Weight Average Mol. Wt. Mw |
|---|---|---|---|
| 3.42 | 19.30 | 2039 | 3443 |
| 4.42 | 19.30 | 2090 | 3356 |
| 5.42 | 26.90 | 2120 | 3610 |
| 6.34 | 26.90 | 2198 | 3687 |

EXAMPLE 2

The flask was charged with 139.62 g tetrahydrofuran, 26.06 g trifluoromethane sulfonic acid monohydrate and 0.65 g water (2.46% water). The flask was maintained at 55° to 65° C. The results are reported in Table 2.

TABLE 2

| Time Hours | Conversion % | Mn | Mw |
|---|---|---|---|
| 1.0 | — | 1268 | 1801 |
| 2.33 | 9.20 | 806 | 1581 |
| 4.08 | 11.36 | 793 | 1657 |
| 5.42 | 13.84 | 906 | 1813 |
| 7.17 | 18.02 | 1044 | — |

EXAMPLE 3

The flask was charged with 120.53 g tetrahydrofuran, 28.12 g trifluoromethane sulfonic acid monohydrate and 0.727 g water (3.1 wt. % water). The flask was maintained at 55° to 65° C. The results are reported in Table 3.

TABLE 3

| Time Hours | Conversion % | Mn | Mw |
|---|---|---|---|
| 1.17 | 7.18 | 614 | 1333 |
| 2.42 | 9.87 | 778 | 1510 |
| 3.92 | 13.03 | 837 | 1660 |
| 6.92 | 21.66 | 627 | — |

EXAMPLE 4

In order to separate the catalyst from product polytetramethylene ether glycol the following cyclohexane extraction process was developed.

To the reactor contents, comprising a mixture of polytetramethylene ether glycol, trifluoromethane sulfonic acid monohydrate and water, some additional water was added and unreacted tetrahydrofuran distilled off as an azeotrope of tetrahydrofuran and water.

After this stripping of unreacted tetrahydrofuran a mixture of water and cyclohexane was added to the reactor, which results in the formation of two phases, the top non-aqueous phase is rich in cyclohexane and contains greater than 95% of the polytetramethylene ether glycol produced in the reaction. The top phase also contains a trace amount of trifluoromethane sulfonic acid monohydrate. The bottom aqueous phase contains greater than 99.9% of the trifluoromethane sulfonic acid monohydrate present and a small amount of the lower molecular weight polytetramethylene ether glycol species. The water from the bottom phase is removed by distillation and the trifluoromethane sulfonic acid monohydrate reused in the next polymerization.

The trace amount of trifluoromethane sulfonic acid monohydrate in the non-aqueous, cyclohexane-rich phase is neutralized with calcium hydroxide to produce calcium trifluoromethane sulfonate, which is filtered from the finished product. The calcium trifluoromethane sulfonate can be converted to trifluoromethane sulfonic acid monohydrate and the recovered trifluoromethane sulfonic acid monohydrate reused.

The polytetramethylene ether glycol is recovered by distilling off the solvents.

We claim:

1. A process for polymerizing tetrahydrofuran to produce polytetramethylene ether glycol comprising contacting tetrahydrofuran with 5 to 50 wt %, based on tetrahydrofuran, of trifluoromethane sulfonic acid monohydrate at 30° to 75° C. in the presence of 1,000 to 7,000 ppm water and recovering polytetramethylene ether glycol having a number average molecular weight in the range of from 600 to 2,200.

2. The process of claim 1 wherein the tetrahydrofuran is contacted with the trifluoromethane sulfonic acid at from 40° to 65° C.

3. The process of claim 2 wherein the amount of trifluoromethane sulfonic acid monohydrate present is from 10 to 30 wt. % of the tetrahydrofuran present.

4. The process of process of claim 3 wherein the tetrahydrofuran in contacted with the trifluoromethane sulfonic acid monohydrate at from 55° to 65°.

5. The process of claim 4 wherein the conversion of tetrahydrofuran to polytetramethylene ether glycol is from 25 to 35%.

6. The process of claim 3 wherein the unreacted trifluoromethane sulfonic acid monohydrate is recycled to the reaction medium.

* * * * *